US009783716B2

(12) United States Patent
Akulichev et al.

(10) Patent No.: US 9,783,716 B2
(45) Date of Patent: Oct. 10, 2017

(54) SEAL ELEMENT

(71) Applicant: FMC Kongsberg Subsea AS, Kongsberg (NO)

(72) Inventors: Anton Akulichev, St. Petersburg (RU); Brede Thorkildsen, Solbergelva (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 14/893,046

(22) PCT Filed: May 20, 2014

(86) PCT No.: PCT/EP2014/060289
§ 371 (c)(1),
(2) Date: Nov. 20, 2015

(87) PCT Pub. No.: WO2014/187795
PCT Pub. Date: Nov. 27, 2014

(65) Prior Publication Data
US 2016/0122608 A1 May 5, 2016

(30) Foreign Application Priority Data

May 22, 2013 (NO) .................................. 20130708

(51) Int. Cl.
C09K 3/10 (2006.01)
C09K 5/06 (2006.01)
E21B 33/00 (2006.01)

(52) U.S. Cl.
CPC .......... *C09K 3/1009* (2013.01); *C09K 3/1006* (2013.01); *C09K 5/063* (2013.01); *E21B 33/00* (2013.01); *C09K 2003/1053* (2013.01); *C09K 2200/0607* (2013.01); *C09K 2200/0612* (2013.01)

(58) Field of Classification Search
CPC .... C09K 2003/1053; C09K 2200/0607; C09K 2200/0612; C09K 3/1006; C09K 3/1009; C09K 5/063; E21B 33/00; E21B 4/003
See application file for complete search history.

(56) References Cited

U.S. PATENT DOCUMENTS

| 4,504,402 A | * | 3/1985 | Chen ...................... C09K 5/063 252/70 |
| 4,825,939 A | * | 5/1989 | Salyer .................... C09K 5/063 165/10 |
| 5,294,133 A | | 3/1994 | Dutta |

(Continued)

FOREIGN PATENT DOCUMENTS

| CN | 102721916 A | * | 10/2012 | |
| WO | WO 94/03743 A1 | | 2/1994 | |
| WO | WO 9403743 A1 | * | 2/1994 | ............. F16J 15/164 |

OTHER PUBLICATIONS

CN 102721916 A, Oct. 2012, Derwent Ab.*
(Continued)

Primary Examiner — Satya Sastri

(57) ABSTRACT

The present invention provides a seal element made in an elastomeric composite, said material comprising an elastomeric polymer and a phase change material (PCM), wherein the PCM is able to provide thermal energy to the elastomeric polymer upon cooling to the phase transition point of the PCM.

19 Claims, 1 Drawing Sheet

(56) References Cited

U.S. PATENT DOCUMENTS

| | | | |
|---|---|---|---|
| 5,718,835 A * | 2/1998 | Momose | C09K 5/063 106/271 |
| 2003/0220432 A1 * | 11/2003 | Miller | C08K 3/04 524/439 |
| 2004/0208912 A1 | 10/2004 | Hayes | |
| 2005/0161212 A1 | 7/2005 | Leismer et al. | |
| 2008/0121436 A1 | 5/2008 | Slay et al. | |
| 2009/0230632 A1 | 9/2009 | Petrash et al. | |
| 2012/0175134 A1 | 7/2012 | Robisson et al. | |

OTHER PUBLICATIONS

CN 102721916 A, Oct. 2012, Machine translation.*
Oro et al., Review on phase change materi; (PCMs) for cold thermal energy storage applications; Applied Energy, 2012, vol. 99, pp. 513-533.*

* cited by examiner

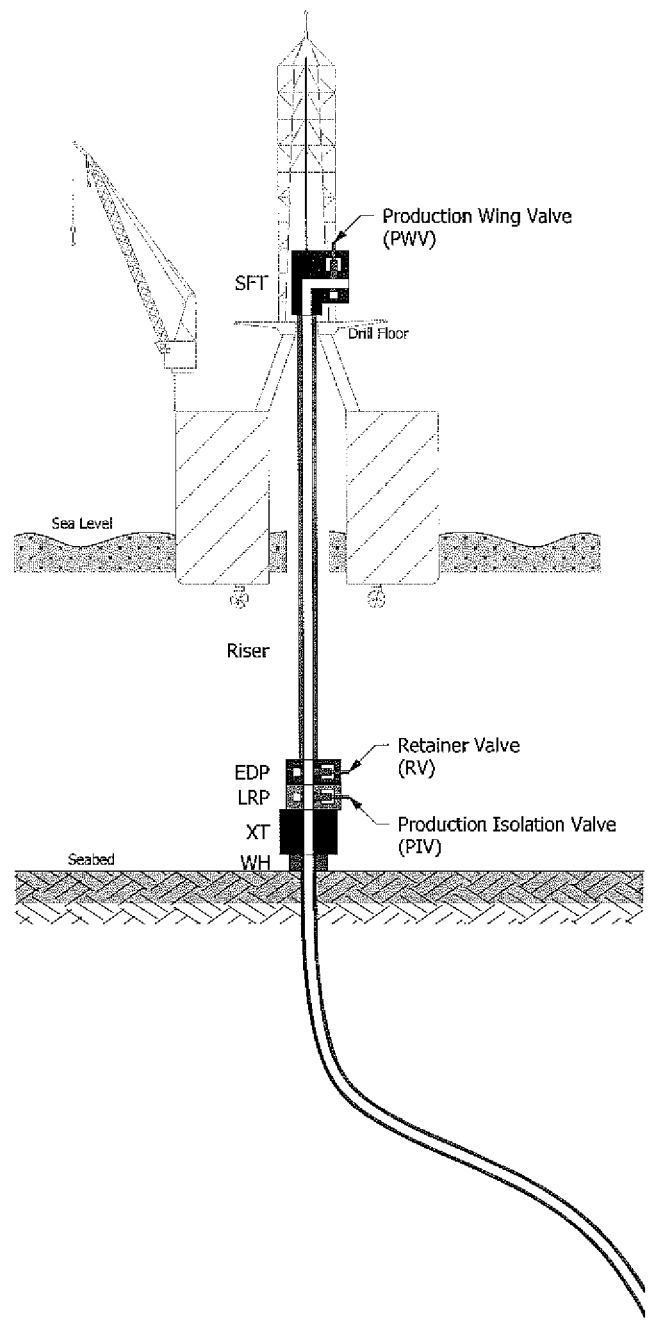

SEAL ELEMENT

FIELD OF THE INVENTION

The present invention concerns the field of elastomeric seals, and more particularly, elastomeric seals which are suitable for use in applications where the seals are subject to transient conditions of very low temperatures.

BACKGROUND OF THE INVENTION

In high pressure retaining systems, such as subsea production and workover equipment, situations may occur when the system pressure needs to be reduced to a required level, e.g., through choking. Rapid depressurization may also be encountered in some units, e.g., quick disconnect pressure control packages installed between a Christmas Tree (XT) or Wellhead (WH) and a riser string, when an emergency shutdown function is activated.

When gas flow is decreased by a choke valve, or it is released through a blow-down valve with a high pressure differential between the upstream and downstream sides of the plugs, the Joule-Thomson effect takes place, manifesting itself in a sharp temperature drop. Although the cooling time may be rather short (typically less than an hour), it is very detrimental to elastomeric seals, which are vulnerable to large temperature variations. In fact, any shock or undesirable movement could crack or rupture an elastomeric composite seal when it is cooled down to a brittle state.

Another point to consider here is the affect of regions with harsh weather conditions, in particular those of high alternating diurnal temperatures in mid seasons. In some areas of the Arctic the maximum daily temperature difference may reach 30-40° C. In the glassy or brittle state rubber seals may not necessarily be damaged, but, since the material may stiffen too much, the seal may lack sealability at low temperatures and, as a consequence, fail to separate the contained medium from the outer environment. The consequences of spillage of hydrocarbons or aggressive chemicals may undeniably be harmful either for people or flora and fauna, which are much more sensitive in cold areas. Hence, it is of utmost importance to maintain the temperature of elastomeric seals above their material glass transition temperature.

Elastomers with very low glass transition points, i.e. elastomers which tolerate low temperatures without becoming brittle, may be utilized in some instances. However, since in general the chemical resistance of such elastomers is inhibited, they are normally not suitable in high temperature wells or those producing extremely aggressive fluids, e.g., those containing a significant percentage of $H_2S$ in the gas phase. On the other hand, elastomeric composites with excellent high temperature stability exist which exhibit inertness to most of the production media as well as the chemicals utilized in the offshore industry, but their low temperature behavior is quite inferior.

The present invention aims to solve or alleviate the material selection challenge for sealing elements with high material glass transition points that might be temporarily subjected to the influence of low temperatures.

SUMMARY OF THE INVENTION

The present invention provides a polymer seal element comprising a phase changing material (PCM) which prevents transient overcooling of the seal element caused by blow down (depressurization) or other temporary chilling conditions that may be faced in frozen regions of the world with rapidly alternating weather, like the Arctic. This is especially important whenever elastomeric seals may reach a temperature corresponding to the glass transition or brittleness point at which they may be easily damaged by an impact load or leak contained fluid to the environment. PCMs represent a group of substances that undergo a phase transformation at a certain temperature, or over a distinct range of temperatures, accompanied by a release of heat. The seal element in the present invention may be formed from an elastomeric composite comprising a high temperature and fluid resistant elastomer, which by virtue of the added PCM and the inherently low thermal conductivity of polymers can withstand exposure to a cold environment for a period of time while maintaining its sealing capability. The present invention is defined by the attached claims and in the following:

In one aspect, the present invention provides a seal element comprising an elastomeric composite, said composite comprising an elastomeric polymer and a phase change material (PCM), wherein the PCM has a heat of fusion larger than 100 kJ/kg and a phase transition point within the temperature range of 233-288 K and is able to provide heat to the elastomeric polymer upon cooling of the seal element to the phase transition point of the PCM.

In a further aspect of the invention, the amount of PCM is in the range of 1-25% v/v, based on the total volume of the elastomeric composite, at 20° C.

The amount of PCM may advantageously be in the range of 5-25% v/v, 1-20% v/v, 1-15% v/v or 1-10% v/v. Alternatively, the amount of PCM in the elastomeric composite may be defined as being within the range of 1-40% w/w, 5-40% w/w, 1-35% w/w, 1-30% w/w or 1-25% w/w based on the total weight of the elastomeric composite.

In a further aspect of the seal element according to the invention, the elastomeric composite constitutes more than 20% v/v, more than 50% v/v, more than 90% v/v, more than 95% v/v or more than 99% v/v of said seal element, based on the total volume of the seal element.

In a further aspect of the seal element according to the invention, the PCM has a heat of fusion greater than 150 kJ/kg, greater than 200 kJ/kg, greater than 300 kJ/kg, and preferably greater than 350 kJ/kg.

In a further aspect of the seal element according to the invention, the phase transition point is within the temperature range of 243-283 K, or more preferably 243-272 K.

In one aspect, the elastomeric polymer in the seal element of the invention is a synthetic rubber. The synthetic rubber may be chosen from the group of NBR (nitrile butadienes), HNBR (hydrogenated nitrile butadienes), FKM (fluoroelastomers) or FFKM (perfluoroelastomers), or any combination thereof. Preferably, the synthetic rubber is FKM or FFKM.

In a further aspect of the seal element according to the invention, the PCM is chosen from the group of paraffins, such as octadecane, fatty acids, fatty esters, alcohols, glycols, salt hydrates, ionic liquids, water, eutectic solutions, eutectic metals, metals with low melting points or any combination thereof.

In a further aspect of the seal element according to the invention, the PCM has a solid-liquid phase change at the transition point.

In a further aspect of the seal element according to the invention, the PCM has a solid-solid phase change at the transition point.

In a further aspect of the seal element according to the invention, the PCM is linked to, or is an integrated part of, a polymer material.

In a further aspect of the seal element according to the invention, the PCM is encapsulated in macro-, micro- or nanosized capsules having a mean diameter size of from 0.1 nm to 5 mm. The capsules are preferably made of a polymer material, but may also be made up of other materials suitable for encapsulating the PCM.

In a further aspect of the seal element according to the invention, the PCM is in the form of granules or particles.

In a further aspect of the seal element according to the invention, the PCM is evenly distributed throughout the elastomeric composite.

In yet a further aspect of the seal element according to the invention, at least one surface of the seal element is PCM-free or the PCM only occupies an internal volume of the seal element. The % v/v of PCM, based on the volume of the elastomeric composite, may vary in a gradual or stepwise manner through the internal volume of the seal element. It may for instance be advantageous to have the largest w/w % of PCM close to the surface of the seal element.

In yet a further aspect of the seal element according to the invention, the heat provided by the PCM is sufficient to increase the temperature of the elastomeric polymer. The temperature increase may be in the range of 5 to 50 K when the seal element is cooled to the phase transition point of the PCM.

In yet a further aspect, the invention provides a method for manufacturing a seal element comprising the following steps:
 blending monomers for an elastomeric polymer with a PCM; and
 curing or vulcanizing the resulting blend.

In a further aspect of the method according to the invention, the resulting blend is added to a suitably seal-shaped mold prior to the curing/vulcanization step.

In yet a further aspect, the invention provides the use of a PCM material having a heat of fusion greater than 100 kJ/kg and a phase transition point within the temperature range of 233-288 K in an elastomeric composite of a seal element. Preferably, the amount of PCM in the elastomeric composite is sufficient to prevent the seal element from reaching a temperature corresponding to the glass transition or brittleness point of said seal element.

In both the use and the method according to the invention, the heat of fusion of the PCM, the temperature ranges of the phase transition point, and the amount of PCM in the elastomeric composite may advantageously be within the ranges used in the seal element according to the invention.

BRIEF DESCRIPTION OF THE DRAWINGS

FIG. 1 is a schematic illustration of a workover riser system comprising a seal element according to the invention.

DETAILED DESCRIPTION OF THE INVENTION

FIG. 1 illustrates a workover system and is meant to help understand the advantages that the present invention provides regarding improvement of safety and reliability of the system. Furthermore, any other equipment experiencing transient blow down conditions could benefit from the proposed technology.

Referring to FIG. 1, an offshore oil and gas rig configured for performing a well intervention operation is depicted. The rig is positioned over an underwater gas well, on top of which permanent seabed equipment is installed, i.e. a Well-head (WH) and a Christmas Tree (XT). The rig is connected to the XT by means of a completion/workover (CWO) riser, which is a subsea conduit generally extending from a Surface Flow Tree (SFT) on the rig down to a temporarily installed workover stack incorporating an Emergency Disconnect Package (EDP) and a Lower Riser Package (LRP). The latter comprises an arrangement of valves that is directly placed on top of the XT and has the function of a well barrier during the operations.

The LRP essentially contains a production isolation valve (PIV) and, when necessary, it may shut down the flow of hydrocarbons or cut any wireline and coiled tubing with the use of shear rams to prepare for a quick disconnect of the riser. The EDP provides a fast remotely-operated disconnect of the riser system and, by means of a retainer valve, prevents hydrocarbons contained inside the riser from being released to the sea.

During a production test both valves are opened and produced gas at a high pressure and the reservoir temperature flows up to the SFT. In the event the PIV is closed, when the gas pressure above the valve is drastically reduced compared to below the valve, a Joule-Thomson effect takes place, leading to a considerable cooling of the gas, possibly down to subzero temperatures. Hence, the surrounding equipment, including the elastomeric seals, may be subjected to undesirable cooling.

Another typical case of the Joule-Thomson effect could be a gas bleed down of the riser through its SFT. The upper part of the riser above sea level is particularly vulnerable during the bleed down, as there is no seawater to keep the riser rather warm. The air, whether cold or warm, does not possess sufficient heat transfer capability compared to the water. Therefore, with the other parameters being equal, the effect of Joule-Thomson cooling above sea level is stronger than subsea.

Elastomeric seal elements of different geometries and dimensions can be installed throughout the system, from the WH to the SFT, and wetted with the produced hydrocarbons. Some of these seals are primary seals and eventually may be exposed to the transient cooling in the gas systems. According to the present invention, such seal elements can be made of a hydrocarbon resistant elastomer comprising a PCM material embedded into the main body of the seal to form a composite. Upon cooling, the PCM liberates a certain amount of thermal energy or heat when the temperature of the retained medium or the ambient air drops to that of the phase transition temperature. Conversely, the PCM will absorb heat from the environment when/if the temperature rises.

From experience and simulation models, the Joule-Thomson effect may cause a temporary chill in some gases down to −70 or −80 Celsius degrees, and, as a consequence, the temperature of the gas retaining equipment, including the elastomeric seals, steadily decreases. The temperature reduction rate in a seal core is certainly more delayed than that of the surrounding steel elements due to the low thermal conductivity and thermal inertia effects of rubbers. Furthermore, a PCM can retard the cooling process in elastomers to an even higher extent (temperature stabilization). The latent heat from phase transition will keep the sealing element rather warm and resilient for a sufficient period of time and, thus, prevent the release of contained hydrocarbons or other fluids to the outer environment. The use of a PCM also counteracts shock cooling effects by letting the seal lose temperature and resilience more gradually, which may be beneficial since it provides more time for the seal to readjust in its seal groove.

The shape of the seal element of the present invention may be designed following commonly used seal practices and may include, but not be limited to, O-rings, S-seals, T-seals, U-seals, V-seals, X-seals, flat seals, lip seals, numerous polymer sealants, back-up rings and gaskets. Also, RAM sealing profiles can be made with PCM fillers.

As the main component of the elastomeric composite, various rubbers, thermoplastics or other polymer groups may be selected depending on their compatibility with the flowing media and the actual operational conditions of a particular seal member. A favorable material is perfluorinated elastomer (FFKM), though other chemical classes might be beneficial. In particular, the following elastomers could be used for the composite formulation: nitrile butadiene (NBR), hydrogenated acrylonitrile butadiene (HNBR), which is also referred to as highly saturated nitrile rubber (HSN), carboxylated acrylonitrile butadiene (XNBR), fluoroelastomer (FKM), fluorosilicone (FMQ), chloroprene (CR), ethylene propylene (EPM), polyurethane (PU), ethylene propylene diene (EPDM), tetrafluoroethylene and polypropylene (FEPM), copolymers thereof and the like. The composite may also comprise or be formed from a thermoplastic, including, but not limited to, polyether ether ketone (PEEK), polyether ketone (PEK), polyether ketone ketone (PEKK), polytetrafluoroethylene (PTFE), and polyoxymethylene (POM). Thermosetting polymers such as different epoxies and phenolics may also be selected as a matrix material.

PCM elements can be either in organic or inorganic form with solid-liquid or solid-solid phase transitions. They can include specifically tailored paraffins, fatty acids, alcohols, glycols, salt hydrates and mixtures thereof, eutectic metals and metals with low melting points, various eutectics and the like. A large number of PCM's are described in the literature and may, provided they have a suitable phase transition point, be used in the present invention. See for instance E. Oró et al., "Review on phase change materials (PCMs) for cold thermal energy storage applications"; Applied Energy, 2012, Vol. 99, pp. 513-533. A preferred phase transition temperature would commonly be in the range of −30 to +10° C.

The PCM may be embedded into the body of the seal element by being contained in macro-, micro- or nanocapsules, or as particles or granules with an effective capsule/particle size starting from 0.1 nm, as well as specific molecular arrangements linked to polymer chains (for instance, so-called molecular encapsulation). The PCM, especially a PCM having a solid-liquid phase transition, may preferably be contained in capsules made of a polymer material to provide a protective coating and increase adhesion to the main material of the seal member. Various types of encapsulation of PCM's are well known to the skilled person.

The required volume percent of a specific PCM depends on its energy storage capacity, the physical qualities of the polymer matrix and the required combination of properties, together with the expected cold exposure periods, and may generally vary over a wide range of 1-25% v/v based on the total volume of the elastomeric composite, at 20° C. Alternatively, the amount of PCM in the elastomeric composite may be defined as being within the range of 1-40% w/w based on the total weight of the elastomeric composite.

Introduction of the PCM into the elastomeric composite should preferably be done prior to curing or vulcanization, though alternative processes, such as spray deposition, may be envisioned. The elastomeric composite may further comprise any necessary components that enhance its physical and mechanical properties, impart a desired appearance and initiate or accelerate chemical reactions. These components include curing agents, reinforcement fillers, plasticizers, antioxidants, pigments and the like.

An Example of a Calculated Composite Formulation

Assume an elastomeric composite comprises a predefined amount of PCM with a volume fraction x and mass $m_{pcm}$. Upon cooling down to the phase transition point, the PCM releases heat corresponding to the latent heat of fusion, $\lambda$ (J/kg). The general equation linking the heat added to or removed from a material with temperature change $\Delta T$ is:

$$Q = cm\Delta T,$$

where c is the specific heat capacity of the material (J/kg·K) and m is the mass of the material (kg).

Therefore, the thermal energy transferred from the PCM to the elastomer matrix leads to an increase of its temperature of $\Delta T$, which may be calculated as follows:

$$\Delta T = \frac{\lambda m_{pcm}}{c_{el} m_{el}};$$

or in terms of density $\rho$:

$$\Delta T = \frac{\lambda \rho_{pcm}^x}{c_{el} \rho_{el}^{(1-x)}}$$

Here, the subscript el denotes elastomer matrix.

The effect of PCM heat release may be further exemplified by taking an elastomeric matrix of FFKM rubber compounded with diethylene glycol (the glycol is encapsulated) as a PCM (see E. Oró et al., "Review on phase change materials (PCMs) for cold thermal energy storage applications"; Applied Energy, 2012, Vol. 99, pp. 513-533). Diethylene glycol has a latent heat of fusion of 247 kJ/kg and a density of 1200 kg/m³. Knowing the typical characteristics of a FFKM elastomer (c=945 J/kg K and $\rho$=2000 kg/m³), the following magnitudes of temperature stabilization can be predicted:

| PCM-content | | |
|---|---|---|
| volume fraction, % v/v | weight fraction, % w/w | $\Delta T$, K |
| 5 | 3 | 8 |
| 10 | 6 | 17 |
| 15 | 9 | 27 |

The invention claimed is:

1. A seal element which is comprised of an elastomeric composite comprising an elastomeric polymer blended with a phase change material (PCM), the PCM having a heat of fusion larger than 200 kJ/kg and a phase transition point within the temperature range of 233-272 K, wherein the PCM provides heat to the elastomeric polymer upon cooling of the seal element to the phase transition point of the PCM, wherein at least one surface of the seal element is PCM-free, and wherein the elastomeric polymer is a synthetic rubber chosen from the group of NBR (nitrile butadiene), HNBR (hydrogenated nitrile butadiene), FKM (fluoroelastomer), FFKM (perfluoroelastomer), or any combination thereof.

2. A seal element according to claim 1, wherein the amount of PCM is in the range of 1-25% v/v based on the total volume of the elastomeric composite at 20° C.

3. A seal element according to claim 1, wherein the PCM has a heat of fusion greater than 300 kJ/kg.

4. A seal element according to claim 1, wherein the phase transition point is within the temperature range of 243-272 K.

5. A seal element according to claim 1, wherein the PCM is chosen from the group of paraffins, alcohols, glycols, salt hydrates, ionic liquids, eutectic solutions, eutectic metals, or any combination thereof.

6. A seal element according to claim 1, wherein the PCM has a solid-liquid phase change at the transition point.

7. A seal element according to claim 1, wherein the PCM is linked to or is an integrated part of a polymer material.

8. A seal element according to claim 1, wherein the PCM is encapsulated in macro-, micro- or nanosized capsules having a mean diameter size of from 0.1 nm to 5 mm.

9. A seal element according to claim 1, wherein the PCM is evenly distributed throughout the elastomeric composite.

10. A seal element according to claim 1, wherein the PCM occupies only an internal volume of the seal element.

11. A seal element according to claim 1, wherein the heat is sufficient to increase the temperature of the elastomeric polymer in the range of 5 to 50 K when the seal element is cooled to the phase transition point of the PCM.

12. A method of manufacturing a seal element comprising the steps of:
   obtaining an elastomeric composite comprising an elastomeric polymer blended with a phase change material (PCM) having a heat of fusion larger than 200 kJ/kg and a phase transition point within the temperature range of 233-272 K, the PCM providing heat to the elastomeric polymer upon cooling to the phase transition point of the PCM; and
   molding the elastomeric composite into at least a part of the seal element;
   wherein the seal element comprises at least one surface which is PCM-free; and
   wherein the elastomeric polymer is a synthetic rubber chosen from the group of NBR (nitrile butadiene), HNBR (hydrogenated nitrile butadiene), FKM (fluoroelastomer), FFKM (perfluoroelastomer), or any combination thereof.

13. A method of sealing a pressure retaining system, comprising the steps of:
   providing a seal element which is comprised of an elastomeric composite comprising an elastomeric polymer blended with a phase change material (PCM), the PCM having a heat of fusion larger than 200 kJ/kg and a phase transition point within the temperature range of 233-272 K, wherein the PCM provides heat to the elastomeric polymer upon cooling of the seal element to the phase transition point of the PCM, wherein at least one surface of the seal element is PCM-free, and wherein the elastomeric polymer is a synthetic rubber chosen from the group of NBR (nitrile butadiene), HNBR (hydrogenated nitrile butadiene), FKM (fluoroelastomer), FFKM (perfluoroelastomer), or any combination thereof; and
   installing the seal element in the system.

14. A seal element according to claim 1, wherein the elastomeric composite constitutes more than 50% v/v of said seal element based on the total volume of the seal element.

15. A seal element according to claim 1, wherein the elastomeric composite constitutes more than 90% v/v of said seal element based on the total volume of the seal element.

16. A seal element according to claim 1, wherein the elastomeric composite constitutes more than 95% v/v of said seal element based on the total volume of the seal element.

17. A seal element according to claim 1, wherein the elastomeric composite constitutes more than 99% v/v of said seal element based on the total volume of the seal element.

18. A seal element according to claim 1, wherein the PCM has a heat of fusion greater than 350 kJ/kg.

19. A seal element according to claim 1, wherein the elastomeric composite constitutes more than 20% v/v of said seal element based on the total volume of the seal element.

* * * * *